United States Patent [19]
Wirt

[11] 4,069,847
[45] Jan. 24, 1978

[54] TREE SHEAR WITH SPHERICAL BLADES

[75] Inventor: Leon A. Wirt, Joliet, Ill.

[73] Assignee: Caterpillar Tractor Co., Peoria, Ill.

[21] Appl. No.: 731,965

[22] Filed: Oct. 13, 1976

[51] Int. Cl.$^2$ ............................................. A01G 23/08
[52] U.S. Cl. ................................... 144/34 E; 144/3 D
[58] Field of Search ................... 144/3 D, 2 Z, 34 R, 144/34 E, 309 AC

[56] References Cited

U.S. PATENT DOCUMENTS

| | | | |
|---|---|---|---|
| 3,540,501 | 11/1970 | Jonsson | 144/34 E |
| 3,817,303 | 6/1974 | Kantola et al. | 144/34 R |
| 3,854,510 | 12/1974 | Matlik | 144/34 R |
| 3,857,425 | 12/1974 | Wiklund | 144/34 R |
| 3,968,821 | 7/1976 | Jonsson | 144/34 R |

Primary Examiner—Harrison L. Hinson
Assistant Examiner—W. D. Bray
Attorney, Agent, or Firm—Phillips, Moore, Weissenberger, Lempio & Majestic

[57] ABSTRACT

A tree-shear apparatus includes two blades, each having a spherical blade portion. The blades are pivotally mounted relative to a frame, with the pivot axes of the blades and the radii of the spherical blade portions being arranged to provide that a true spherical cut of a tree is achieved.

4 Claims, 5 Drawing Figures

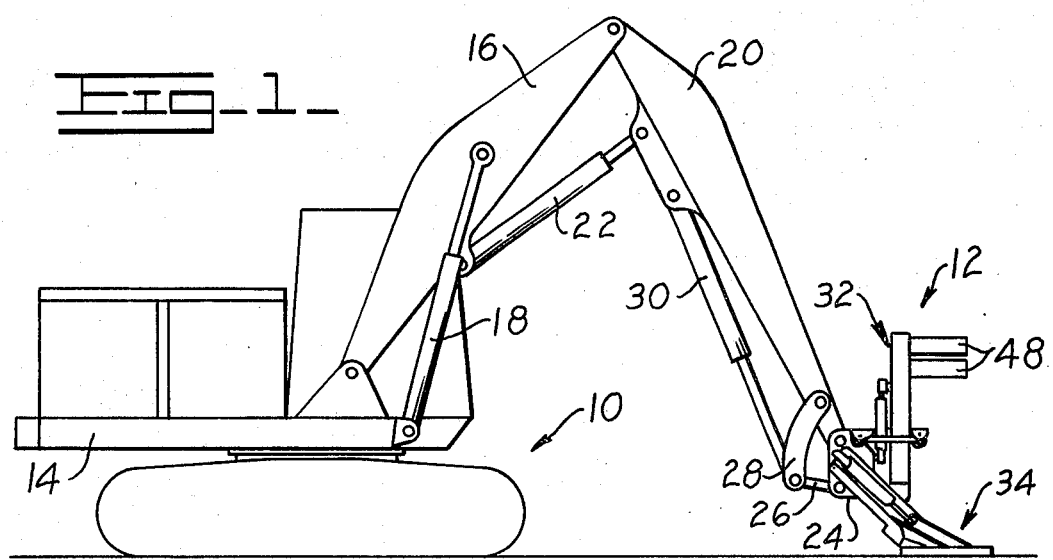
Fig-1-
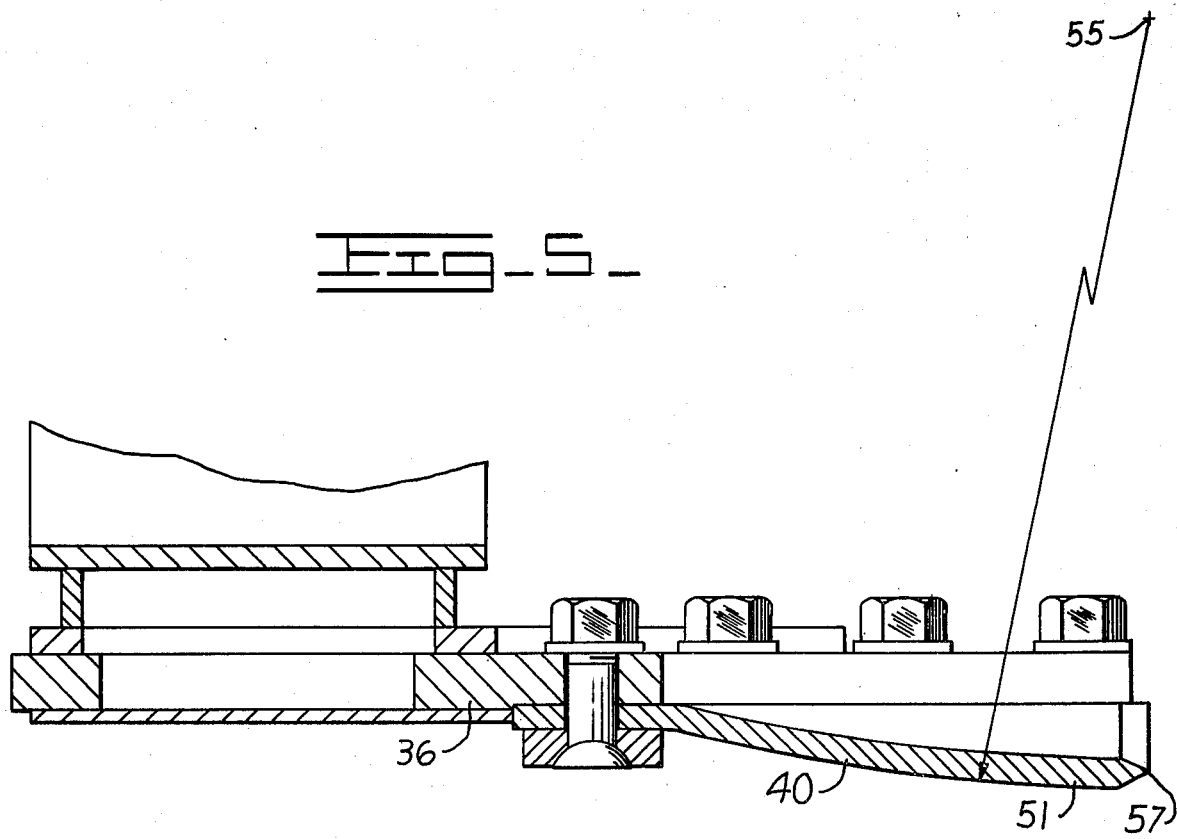
Fig-5-

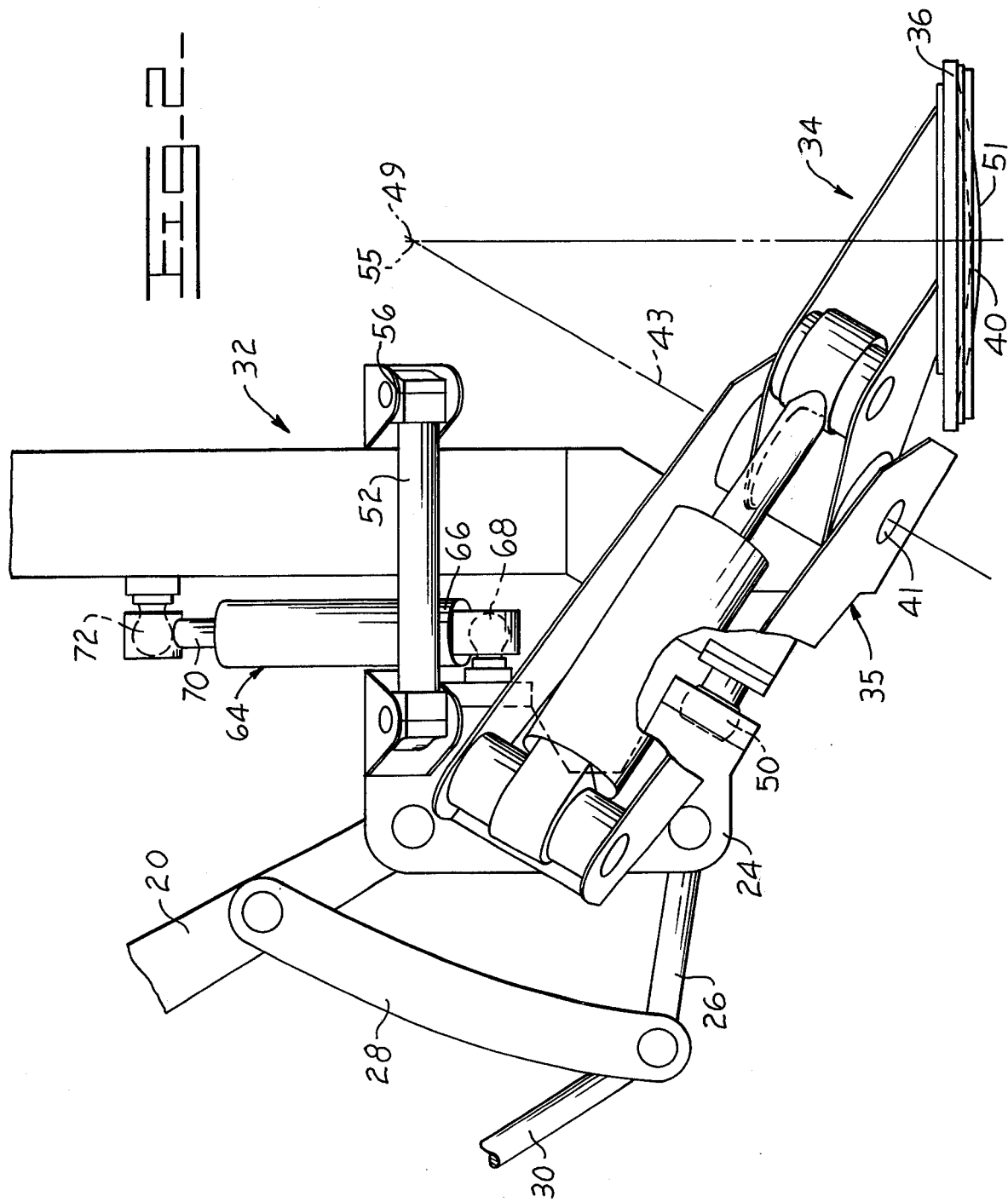

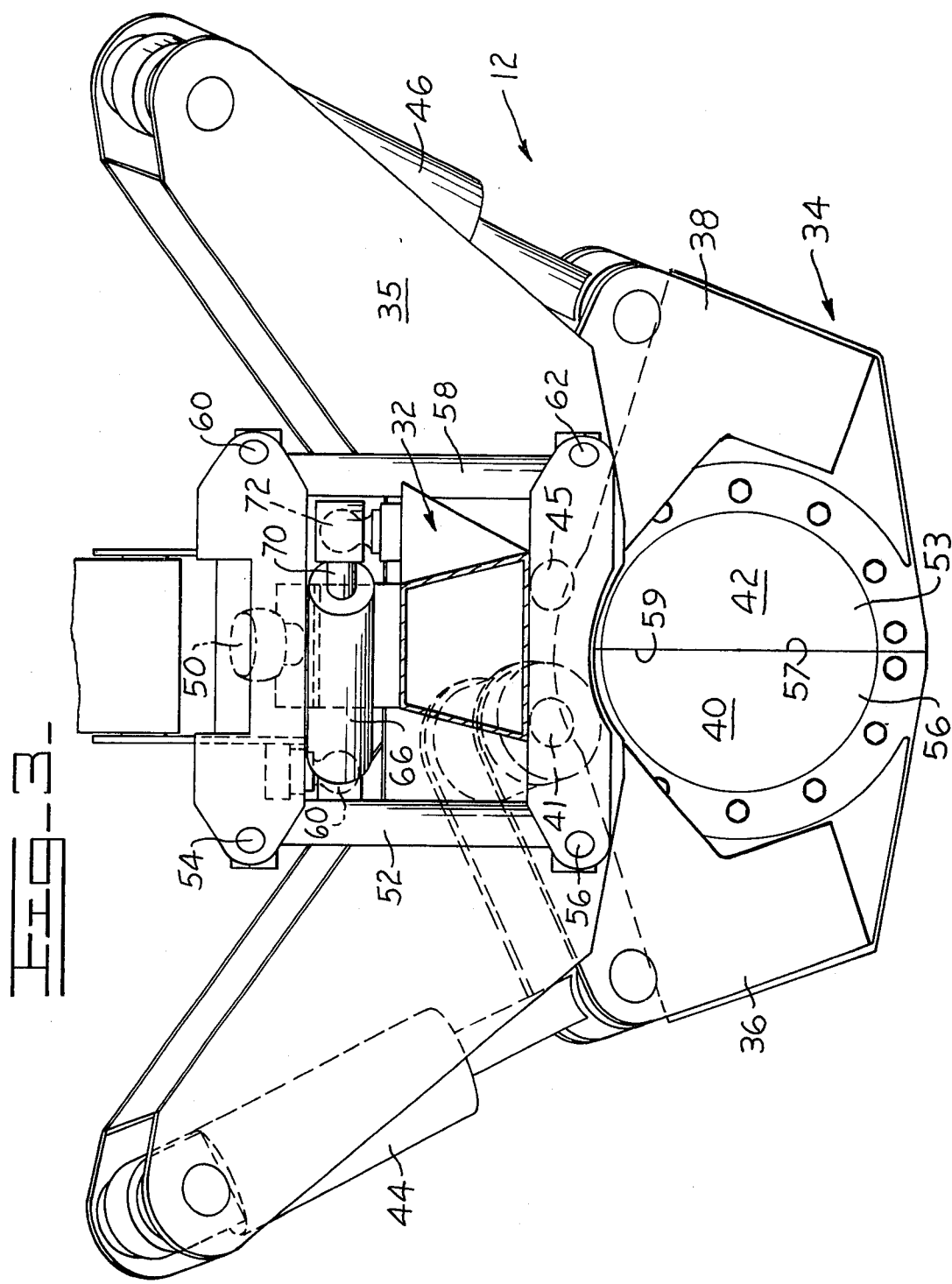

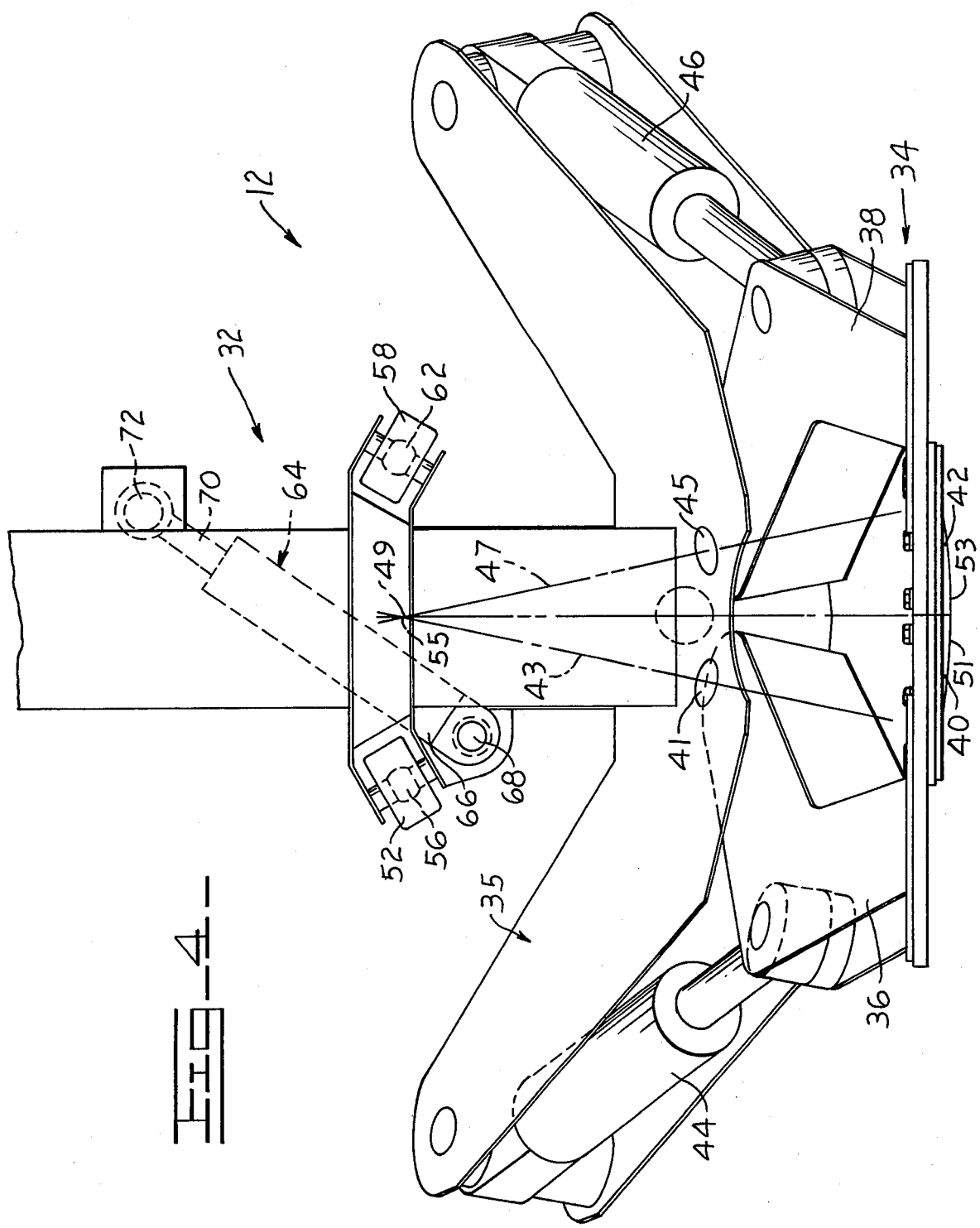

TREE SHEAR WITH SPHERICAL BLADES

BACKGROUND OF THE INVENTION

In general, it is known to provide a pair of members for shearing a tree, at least one of which is movable in a manner so as to determine a spherical cut of a tree. See, for example, U.S. Pat. No. 3,540,501; U.S. Pat. No. 3,854,510; and Canadian Pat. Nos. 873,685, 840,776 and 975,260. In each of these patents, the two elements utilized for the shearing of a tree (i.e., two-blade elements, or a blade element and anvil) are pivotally connected by means of a single pivot pin, which must absorb a relatively great amount of the loads placed on the two elements during the shearing operation. It will be understood that it is highly desirable to carry the loads placed on the two elements in a more efficient manner meanwhile still achieving the spherical tree cut described above to minimize tree damage during such cut.

Of more general interest in this area are U.S. Pat. No. 3,857,425, disclosing a spherical saw-blade, movable in a pendulous motion, U.S. Pat. No. 1,509,994, disclosing a pair of cutting elements of generally cylindrical configuration, U.S. Pat. No. 3,837,382, which discloses a system including a cutting blade of generally cylindrical configuration, U.S. Pat. No. 3,835,901, which discloses a rotary saw ring as a cutting element, Canadian Pat. No. 896,322, which discloses a pair of trough-shaped blades, movable toward and away from each other, and Canadian Pat. No. 975,661, disclosing cutting bits in the shape of part of a double cone.

SUMMARY OF THE INVENTION

Accordingly, an object of this invention is to provide tree shearing apparatus, which includes a pair of elements for shearing a tree to provide a spherical cut thereof, meanwhile insuring that the cutting loads during such shearing of the tree are properly carried by the apparatus.

Broadly stated, the apparatus comprises a tree-cutting apparatus comprised of frame means, a first blade pivotally mounted to the frame means so as to be pivotable relative thereto about a first axis, and a second blade pivotally mounted relative to the frame means so as to be pivotable relative thereto about a second axis. The blades are movable to open and close positions through the pivoting thereof. The first and second axes intersect, and the first and second blades define spherical blade portions. The centers of the spherical blade portions are coincident, with the radii of the spherical blade portions being equal. The centers of the spherical blade portions lie at the intersection of the first and second axes.

BRIEF DESCRIPTION OF THE DRAWINGS

These and other objects of the invention will become apparent from a study of the following specification and drawings in which:

FIG. 1 is an overall side elevation of apparatus including the invention;

FIG. 2 is a side elevation of the tree shear mechanism;

FIG. 3 is a plan view of the tree shear mechanism as shown in FIG. 2;

FIG. 4 is a front elevation of the tree shear mechanism as shown in FIGS. 2 and 3; and FIG. 5 is a sectional view of a portion of the blade apparatus as shown in FIGS. 2-4.

DESCRIPTION OF THE PREFERRED EMBODIMENT

Shown in FIG. 1 is a track-type vehicle 10 which, for example, may be of the type which normally includes an excavating implement thereon. However, in place of such excavating implement is a tree shear mechanism 12. More specifically, the vehicle 10 includes a frame 14 to which is pivotally mounted a boom 16. A cylinder 18 interconnects the frame 14 and boom 16, for selectively raising and lowering the boom 16. A stick arm 20 is pivotally mounted to the extending end of the boom 16, and a cylinder 22 interconnects the boom 16 and stick arm 20 to provide raising and lowering of the stick arm 20 relative to the boom 16.

Pivotally mounted to the extending end of the stick arm 20 is a body 24. A link 26 is pivotally mounted to the body 24 and extends therefrom, and a connecting link 28 is pivotally mounted to the stick arm 20 adjacent the extended end thereof and the extended end of the link 26. A cylinder 30 interconnects the stick arm 20 and the pivotal connection of the links 26, 28, so that extension and retraction of the cylinder 30 provides for tilting of the body 24 about an axis transverse of the vehicle 10.

The tree shear mechanism 12 includes a body or frame 32 having shear means 34 operatively mounted thereto, the frame 32 being mounted forwardly of the body 12. The shear means 34 includes a support frame 35 to which are pivotally mounted first and second jaws 36, 38, having first and second cutting blades 40, 42 mounted thereto respectively.

The blade 40 is pivotally mounted relative to the frame 32 by pivot means in the form of a pivot pin 41 so as to be pivotable relative to the frame about a first axis 43. Likewise, the blade 42 is pivotally mounted relative to the frame 32 by means of second pivot means in the form of a second pivot pin 45, so as to be pivotable relative to the frame about a second axis 47. It is to be noted that the first and second axes 43, 47, intersect as shown at 49. The blades 40, 42 define respective spherical blade portions 51, 53 with the centers of the spherical blade portions 51, 53, i.e., for example, that shown at 55 with the blades 40, 42 in their closed positions, being coincident, with the radii of the spherical blade portions 51, 53 being equal (see FIG. 4). The centers 55 of these spherical blade portions 51, 53 lie at the intersection 49 of the axes 43, 47. The spherical blade portions 51, 53 define curved cutting edge portions 57, 59 adjacent to each other with the blades 40, 42 in their closed positions, and the pivot pins 41, 45 lie on either side of the adjacent pair of cutting edge portions 57, 59. In fact, the cutting edge portions 57, 59 lie in a plane substantially perpendicular to a plane in which the axes 43, 47 lie, with the pivot pins lying equally distant from such plane in which the cutting edge portions 57, 59 lie on either side thereof. Cutting edge portions 57, 59 lie in a plane which bisects the angle between the two pivot pins 41, 45.

The spherical blade portions 51, 53 are substantially identical in configuration. Cylinders 44, 46 interconnect the support frame 35 and jaws 36, 38, as is well known, so that extension of the cylinders 44, 46 brings the blades 40, 42 together in a cutting action, and retraction of the cylinders 44, 46 draws the blades 40, 42 apart. Grapple arms 48 are also movably mounted to the frame 32 adjacent to the upper end thereof, for gripping the tree as is well known.

The frame 32 and body 24 are connected by a pivot 50, such pivot taking the form of a spherical bearing. A first link 52 pivotally interconnects the body 24 and frame 32 on one side of the body 24 and frame 32. The link 52 has one end pivotally connected to the body 24 through a spherical bearing 54, and the other end pivotally connected with the frame 32 through a spherical bearing 56. A second link 58 interconnects the body 24 and frame 32 on the other side of such body 24 and frame 32 so that the first and second links 52, 58 are disposed on either side of the body 24 and on either side of the frame 32. One end of the second link 58 is pivotally connected to the body 24 by means of spherical bearing 60 and the other end of the link 58 is pivotally connected to the frame 32 by means of a spherical bearing 62. A single cylinder 64 has its head end 66 pivotally connected relative to the body 24 by means of a spherical bearing 68 and has its rod end 70 pivotally connected relative to the frame 32, by means of a spherical bearing 72.

The cylinder 64 defines a fully extended position upon sufficient introduction of fluid pressure to the head end 66 thereof, rod end pressure, of course, being released during such operation. The cylinder 64 defines a fully retracted position upon position introduction of fluid pressure to the rod end 70 thereof, with fluid pressure, of course, being released from the head end 66 thereof (FIG. 5). The extended position of the cylinder 64 determines a tilt position of the frame 32 and shear means 34 in one direction relative to the body 24 and, thus, relative to the vehicle 10, and the retracted position of the cylinder 64 determines a tilt position of the frame 32 and shear means 34 in the other direction relative to the body 24 and thus relative to the vehicle 10. Thus, selective tilting of the frame 32 and shear means 34 about a longitudinal axis of the vehicle 12 is provided.

During such tilting by the cylinder 64, the links 52, 58 provide effective location and guiding of movement of the frame 32 and shear means 34 relative to the body 24.

In the use of the device, the vehicle 10 is driven to an appropriate location, so that the blades 40, 42, in their open position, can be disposed on either side of a tree. The frame 32, and shear means 34 mounted thereto can be pivoted about an axis transverse of the vehicle 10 through extension and retraction of the cylinder 30 to allow for angling of the tree relative to the vehicle 10. The frame 32 and shear means 34 mounted thereon can also be lifted and lowered relative to the vehicle 10 to allow for differences in terrain from the vehicle 10 to the tree. Furthermore, through actuation of the cylinder 64, the frame 32 and shear means 34 can be tilted along a longitudinal axis of the vehicle 10, to allow for different slopes of ground in the area of the shear means 34 and vehicle 10.

The tree may then be gripped by actuation of the grapple arms 48 and cut by actuation of the cylinders 44, 46. It will be noted that through such particular configuration, as the blades 40, 42 are moved from their open to their closed positions through actuation of the cylinders 44, 46, a true spherical cut is made by the blades 40, 42, resulting in minimal tree damage from the cut. Because of the lateral placing of the pivot pins 41, 45 it is insured that proper distribution of the cutting forces to the frame 34 is achieved. This is so because of the particular placement and angling of the pair of pivot pins 41, 45 in relation to the centers of the spherical blade portions 51, 53 and in relation to the cutting edge portions 57, 59 of the blades 40, 42. The cylinder 30 can then be actuated to tilt the entire mechanism forwardly, carrying the tree therein, so that the tree can be positioned generally horizontally so as to be laid on the ground after it is cut. The links 52, 58 provide extremely effective support of this great load as the tree is moved to such horizontal position.

It should also be noted that, because of the upward, rearward angling of the cylinders 44, 46, such cylinders are raised above the ground so as to be removed from hazards. Also, the apparatus provides only a small projected ground area for convenient use in snow, and provides improved operator visibility.

What is claimed is:

1. A tree cutting apparatus comprising:
   frame means;
   a first blade pivotally mounted relative to the frame means so as to be pivotable relative thereto about a first axis;
   a second blade pivotally mounted relative to the frame means so as to be pivotable relative thereto about a second axis;
   the blades being movable to open and closed positions through said pivoting thereof;
   the first and second axes intersecting at a point of intersection spaced above the cutting planes of said first and second blades;
   the first and second blades defining respective blade portions the blade portions being configured as respective sphere portions;
   the centers of the respective sphere portions being coincident, the radii of the respective sphere portions being equal;
   the centers of the respective sphere portions lying at the point of intersection of the first and second axes.

2. The apparatus of claim 1 wherein the spherical blade portions defines curved cutting edge portions adjacent each other with the blades in their closed positions, and wherein the first and second blades are pivotally mounted relative to the frame means by first and second pivot means on either side of the adjacent pair of cutting edge portions.

3. The apparatus of claim 2 wherein the adjacent cutting edge portions lie in a plane substantially perpendicular to a plane in which the pivot axes of the first and second pivot means lie, and wherein the pivot means lie equidistant from said plane in which said cutting edge portions lie on either side thereof.

4. The apparatus of claim 3 wherein the first and second spherical blade portions are substantially identical in configuration.

* * * * *